US009580043B2

United States Patent
Collins et al.

(10) Patent No.: US 9,580,043 B2
(45) Date of Patent: *Feb. 28, 2017

(54) SPECIALIZED RESTRAINT SYSTEMS FOR AMUSEMENT RIDES

(71) Applicant: Team IX, Ltd., Newbury Park, CA (US)

(72) Inventors: David L. Collins, Newbury Park, CA (US); Sirzat Sayin, Istanbul (TR); David Althoff, Jr., Columbus, OH (US)

(73) Assignee: Team IX, Ltd., Newbury Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/832,969

(22) Filed: Aug. 21, 2015

(65) Prior Publication Data
US 2015/0360644 A1    Dec. 17, 2015

Related U.S. Application Data

(62) Division of application No. 13/944,488, filed on Jul. 17, 2013, now Pat. No. 9,126,554, which is a division of application No. 13/046,678, filed on Mar. 11, 2011, now Pat. No. 8,505,383, which is a division of application No. 11/732,345, filed on Apr. 3, 2007, now Pat. No. 7,905,789.

(51) Int. Cl.
| *G08B 21/00* | (2006.01) |
| *B60R 22/48* | (2006.01) |
| *B60R 22/12* | (2006.01) |
| *G01V 1/00* | (2006.01) |
| *B60R 22/02* | (2006.01) |

(52) U.S. Cl.
CPC .............. *B60R 22/48* (2013.01); *B60R 22/02* (2013.01); *B60R 22/12* (2013.01); *G01V 1/00* (2013.01); *B60R 2022/027* (2013.01); *B60R 2022/4808* (2013.01); *Y10T 24/45623* (2015.01)

(58) Field of Classification Search
CPC ......... B60R 22/48; B60R 22/02; B60R 22/12; G01V 1/00
USPC .................................... 340/687; 297/464–469
See application file for complete search history.

(56) References Cited

U.S. PATENT DOCUMENTS

| 3,192,035 A | 6/1965 | Harald |
| 3,963,090 A | 6/1976 | Hollins |
| 4,005,877 A | 2/1977 | Humphries |
| 4,327,533 A | 5/1982 | Sterner |
| 4,655,312 A | 4/1987 | Frantom et al. |
| 5,182,836 A | 2/1993 | Burkat |
| 5,529,382 A | 6/1996 | Burkat |

(Continued)

*Primary Examiner* — Eric M Blount
(74) *Attorney, Agent, or Firm* — Fulwider Patton LLP

(57) ABSTRACT

The patron restraint system for amusement rides includes a locking receiver with a locking assembly for engaging a restraining strap. The engagement of the restraining strap in the locking receiver can be verified by a ride operator by visual or physical inspection, or by a sensor system indicating the locked or unlocked state of the locking receiver. A latching ratchet mechanism may be provided in the receiver to restrict movement of the restraining strap until it is released by the ride operator. The sensor system includes an acoustic sensor that detects alignment of an aperture with a piezoelectric acoustic emitter and an acoustic detector.

8 Claims, 17 Drawing Sheets

(56) References Cited

U.S. PATENT DOCUMENTS

| | | | |
|---|---|---|---|
| 5,582,372 A | 12/1996 | Wu | |
| 5,586,503 A | 12/1996 | Rehorn | |
| 5,719,824 A | 2/1998 | Boucher | |
| 5,853,005 A | 12/1998 | Scanlon | |
| 6,287,211 B1 | 9/2001 | Bolliger et al. | |
| 6,402,624 B1 | 6/2002 | Larson et al. | |
| 6,637,341 B2 | 10/2003 | Kroon et al. | |
| 6,820,311 B2 | 11/2004 | Checketts | |
| 6,971,316 B2 | 12/2005 | Hansen et al. | |
| 6,988,297 B2 | 1/2006 | Willard et al. | |
| 7,166,032 B2 | 1/2007 | Smith et al. | |
| 7,805,978 B2 | 10/2010 | Riley et al. | |
| 7,905,789 B2 * | 3/2011 | Collins | B60R 22/12 24/633 |
| 2005/0275275 A1 * | 12/2005 | Muller | B60R 21/02 297/464 |
| 2006/0202542 A1 | 9/2006 | Pribonic | |

* cited by examiner

SPECIALIZED RESTRAINT SYSTEMS FOR AMUSEMENT RIDES

CROSS-REFERENCES TO RELATED APPLICATIONS

This application is a divisional of U.S. application Ser. No. 13/944,488, filed Jul. 17, 2013, which is a divisional of U.S. application Ser. No. 13/046,678, filed Mar. 11, 2011, U.S. Pat. No. 8,505,383, issue date Aug. 13, 2013, which is a divisional of U.S. application Ser. No. 11/732,345, filed Apr. 3, 2007, U.S. Pat. No. 7,905,789, issue date Mar. 15, 2011 which are incorporated by reference in their entirety.

BACKGROUND OF THE INVENTION

Seat belt type restraint systems have been used extensively to restrain riders in vehicles as well as amusement rides and devices. Typically, seat belt type patron restraint systems have a manual "latching" system that is engaged or released by the patron (rider). There are presently no seat belts with locking systems that do not require external electrical power and/or an external energy source to achieve the "locked" condition. Conventional seat belt systems do not commonly have the ability to provide redundant "locking" systems. Conventional seat belts do not currently have redundant "locking" systems that are fail-safe (fail-to-safe) under loss-of-power or external energy. Conventional seat belts do not commonly have a sensor or indicator method for validating the "latched" condition to the ride operator or attendant that do not require external electrical power and/or an external energy source. There are presently no seat belt or other type of safety restraint "locking" system sensors that are commonly providing reliable operation under conditions of contamination with dirt, moisture, lubricants or other debris that do not require adjustment.

Industry standards for patron restraint systems on amusement rides and devices range from restraint devices for kiddie rides through restraint systems for spectacular and high acceleration rides. The industry standards require the ride designer to perform a patron containment analysis to make sure the patron is contained on the ride under normal and anticipated emergency operation. Authorities Having Jurisdiction (AHJ)(Regulatory) are imposing more stringent requirements for patron restraints. These AHJ's are requiring individual patron restraints where multiple patron restraints were used. The AHJ's are requiring "locking" restraints where previously "latching" patron restraints had been used. The term "latching" as used herein implies that the restraint can be unlatched at any time during a ride cycle by a patron or patrons. The term "locking" as used herein implies that the restraint is "locked" prior to the start of the ride cycle and can not be opened until the ride cycle is completed and the patrons are ready to exit the ride. The industry requirements range from patron restraints that are used to contain multiple patrons with a single restraint device and are manually "latched" and released to patron restraints that are automatically "locked" and automatically released. Depending on the accelerations imposed on the patrons and the ride designer's containment analysis, the patron restraints are required to be redundant, fail-safe (fail-to-safe) and, where necessary, to have a secondary "latching" or "locking" patron restraint element. The "latching" or "locking of simpler patron restraints can be accomplished by the ride operator or attendant by manual and/or visual means. Rides requiring redundancy and/or secondary patron restraints also need to be automatically "locked" and "unlocked" by the ride operator and have sensors that prevent the ride from starting in the event the patron restraint is not properly positioned and "locked." Rides requiring redundancy and/or secondary patron restraints are required, whenever possible, to cause the ride to stop in the event a patron restraint comes open while the ride is in operation.

Industry standards also require that a restraint system on amusement rides and devices should provide a manual release of the restraint system that can be operated by authorized personnel in an emergency without special tools. This requirement places emphasis on a restraint release system that can be applied to individual or selected groups of restraints to evacuate riders from any location on a ride circuit.

One known type of patron restraint system requires power, such as electrical power or compressed air, in order to lock the restraint system, and loss of power will unlock the restraint system. This type of patron restraint system will therefore not provide fail-safe operation for the majority of commonly used amusement rides and devices where electrical power or compressed air are not available on the ride during operation. In addition, it has been found that patron restraint systems that rely upon electrical power or compressed air to maintain locking of the restraint system are prone to failure, since electrical power and air pressure can be lost under a number of conditions, such as failure of a pipe, pneumatic tubing, or a faulty control valve, for example.

A number of amusement rides use an over-the-shoulder restraint system. To prevent a rider from slipping out from under the shoulder restraint, ride manufacturers have added a high point at the front of the seat that goes between the rider's legs, and a "crotch strap" that is intended to keep the rider from slipping out from under the shoulder restraint under dynamic forces of the ride. The crotch strap also helps to prevent the shoulder restraint from opening in the event of a failure of the locking system for the shoulder restraint. However, most crotch straps are made up of short lengths of a seat belt with a standard seat belt buckle and tongue engagement that is not lockable, and that can be released by a rider. There is a long standing but unresolved need in the amusement ride and device industry for a simple, high strength, low maintenance locking restraint system that can augment or replace existing restraint systems. The long-standing but unresolved need also includes the requirement for a restraint system that is fully adjustable and able to accommodate all sizes of patrons from children (on suitable rides) through the $99^{th}$ percentile male and female with comfort and proper containment.

It would therefore be desirable to provide a patron restraint system for a vehicle typically having a plurality of seats that meets or exceeds industry standards and requirements established by Authority Having Jurisdiction (AHJ) (Regulatory) for patron containment and restraint on amusement rides and devices, in a system that can accommodate riders from a $99^{th}$ percentile male down to and including a minimum height, $50^{th}$ percentile male or female for which the ride or attraction is suitable, so as to accommodate riders with a minimum height of 36 inches (2.5 to 3 years of age). It would also be desirable to provide a patron restraint system for a vehicle typically having a plurality of seats that meets requirements for single or redundant locking of the patron restraint system. It would also be desirable to provide a specialized patron restraint system that would provide a fully lockable belt type restraint to improve rider containment, without requiring physical alteration of existing seat designs in any substantial way. It would also be desirable to provide a specialized patron restraint system that provides a ride operator a way of visually verifying that the restraint is properly engaged, for a properly seated rider. The present invention meets these and other needs.

SUMMARY OF THE INVENTION

Briefly, and in general terms, the present invention provides for a patron restraint system for a seat of a vehicle of an amusement ride. The restraint system includes a restraining strap, at least a portion of which is toothed or grooved, and a locking receiver having a toothed or grooved locking element that engages the toothed or grooved portion of the restraining strap. One end of the restraining strap is anchored to the frame of the ride, and the other end of the restraining strap is free and accessible to the rider. In one presently preferred aspect, the restraining strap may include a restraining strap pad adapted to overly a patron's lap or torso, and an additional crotch strap and one or more shoulder straps may be connected to the restraining strap at the area of the restraining strap pad. Upon entering the seat, the rider lifts the restraining strap and loosely brings it across the rider's lap. The rider then inserts the free end of the restraining strap into an entry aperture in the locking receiver, and pushes the restraining strap through the receiver until the free end of the restraining strap exits the receiver through an exit aperture. The free end of the restraining strap is typically colored in bands so that it is visible to the ride operator. The rider continues to push or pull the restraining strap through the receiver until it is comfortably tightened in place against the rider's lap.

Each locking receiver includes a locking assembly for locking the restraining strap, so that the restraining strap can not be withdrawn from the receiver unless some action to unlock the receiver is taken by the ride operator. The position of the restraining strap in the locking receiver can provide a visual indication of the locked or unlocked state of the receiver. The ride operator thus can visually or physically verify that each rider is properly seated and that the patron restraint system is in proper contact with each rider's body, and that the locking receivers at each seat are engaged. When the ride operator is satisfied that the riders are secured, the ride operator can then start the ride cycle. Alternatively, or supplemental to visual or physical checking of the condition of the seat restraints, one or more lock-sensors may be provided in each receiver to detect a locked condition of the locking receivers, to output information to a controller as to the locked or unlocked state of the receiver. Control decisions for the ride may thus be made by a ride operator based on visual inspection of the restraining strap and locking receiver, and based on information at a controller from one or more sensors within the receiver that sense the state of mechanical locking elements within the receiver. A means for unlocking the receiver also is provided that does not require special tools or internal or external energy sources.

A latching ratchet mechanism optionally also may be provided in the receiver to restrict the restraining strap movement so that the restraining strap remains in place and can not be loosened or disengaged from the receiver until it is released by the ride operator, whether by physically releasing the patron restraint system by pressing a mechanically connected release mechanism on the ride, or by pushing a RESTRAINT OPEN button, or by turning a RELEASE OPEN switch on the ride control panel, so that the restraints are then automatically released when the ride is verified to be in a Load/Unload position. During this time the locking elements in the receiver are in an engaged position.

The present invention accordingly provides for a patron restraint system for use with a seat of a vehicle of an amusement ride, including a flexible restraining strap and a locking receiver for receiving the restraining strap. The restraining strap has an anchored end mounted to a frame of the seat, and a free end, and at least a portion of the restraining strap has a plurality of notches or teeth on at least one side of the restraining strap. In a presently preferred aspect, the free end of the restraining strap is colored to facilitate visual inspection of proper insertion of the restraining strap in the locking receiver. The locking receiver includes a housing defining a restraining strap channel for receiving the restraining strap, and the restraining strap channel has an entry opening at one end of the channel, and an exit opening at the other end of the channel. The locking receiver includes a locking assembly having at least one locking element having an engaged position for engaging the restraining strap to prevent movement of the restraining strap, and having a released position for releasing the restraining strap to permit movement of the restraining strap. In one presently preferred aspect, the locking assembly includes first and second locking elements. The patron restraint system also includes means for moving one or more of the locking elements to the engaged position and for moving the one or more locking elements to the released position.

In a presently preferred embodiment, the housing of the locking receiver contains guide walls defining the restraining strap channel, and the locking assembly includes a cylindrical locking wheel rotatably mounted in the housing. In another presently preferred aspect, the locking wheel has an outer surface defining a plurality of notches or teeth corresponding to the notches or teeth of the restraining strap, for engaging the restraining strap, and the restraining strap channel extends about the locking wheel. First and second locking elements are provided, and include a pair of locking plates slidably mounted for slidable movement between an engaged position engaging the locking wheel and a released position spaced apart from the locking wheel. In a preferred aspect, the first and second locking plates each have a first end and a second end, the first end having a plurality of notches or teeth for engaging corresponding notches or teeth of the locking wheel, and the second end having a cam aperture, wherein the means for moving the one or more elements includes first and second cylindrical cam pins, and the cam apertures of the locking plates are engaged by the cam pins, which can be actuated by a ride operator. The locking wheel may further include a latching ratchet mechanism to restrict the restraining strap to movement in one direction to tighten the restraining strap until it is released by a ride operator, whether by physically releasing the patron restraint system by pressing a mechanically connected release mechanism on the ride, or by pushing a RESTRAINT OPEN button, or by turning a RELEASE OPEN switch on the ride control panel, so that the restraints are then automatically released when the ride is verified to be in a Load/Unload position.

In a second presently preferred embodiment, the locking assembly includes first and second mating sections having "S" shaped, sigmoid or sinusoidal surfaces adjacent to each other, and defining a restraining strap channel therebetween, with one or more of the surfaces defining a plurality of notches or teeth for engaging corresponding notches or teeth of the restraining strap. In a presently preferred aspect, at least one of the first and second mating sections is slidably mounted in the housing for movement toward the other of the first and second sections to trap the restraining strap in an engaged position, and for movement away from the other of the first and second sections to release the restraining strap in a released position. In another aspect, a plurality of compression springs may be mounted in the housing to bias the two sections into engagement with the other. In another presently preferred aspect, the means for moving one or more of the locking elements includes a cam device provided between cam arms mounted to the exterior planar sides of the first and second mating sections, for alternately engaging and releasing the first and second mating sections of the locking receiver.

In another presently preferred aspect, the locking assembly may further include a sensor system to detect whether the locking assembly is engaged. In one aspect, the sensor system may utilize an acoustic sensor system, including an acoustic emitter for emitting acoustic energy, an acoustic detector for sensing the acoustic energy and outputting a detection signal in response to the acoustic energy, and one or more alignment elements interposed between the acoustic emitter and the acoustic detector. The one or more alignment elements include one or more acoustic apertures, and the one or more alignment elements are mounted in the locking assembly such that when the one or more acoustic apertures are moved into alignment with the acoustic emitter and the acoustic detector, the acoustic energy from the acoustic emitter is received by the acoustic detector.

In another presently preferred aspect, the one or more alignment elements include a lock plate with an acoustic aperture therethrough, and the lock plate is fixed to a sliding shaft telescopically mounted in sliding relationship with a guide mounted to the locking assembly. In another preferred aspect, the acoustic emitter is an acoustic pulse emitter, the acoustic detector is an acoustic pulse detector, and the lock plate is aligned with the acoustic pulse emitter on one side of the acoustic aperture and the acoustic pulse detector on the other side of the acoustic aperture when the locking assembly is in an engaged position.

Other features and advantages of the present invention will become more apparent from the following detailed description of the preferred embodiments in conjunction with the accompanying drawings, which illustrate, by way of example, the operation of the invention.

DETAILED DESCRIPTION OF THE PREFERRED EMBODIMENTS

Figure 1:
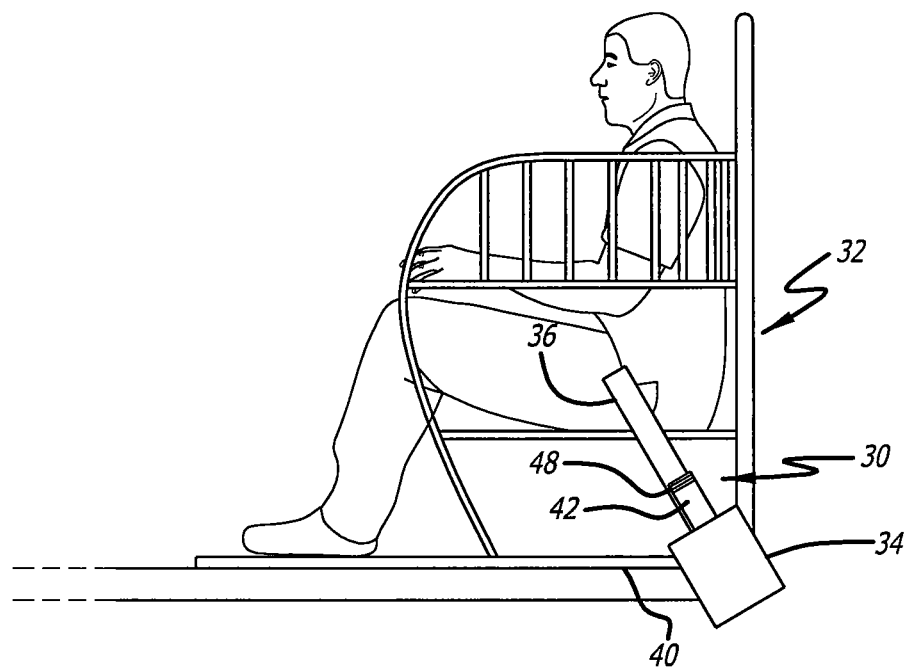
FIG. 1 is a diagram of a side view of an amusement ride seat with the patron restraint system according to the invention.
Figure 2:
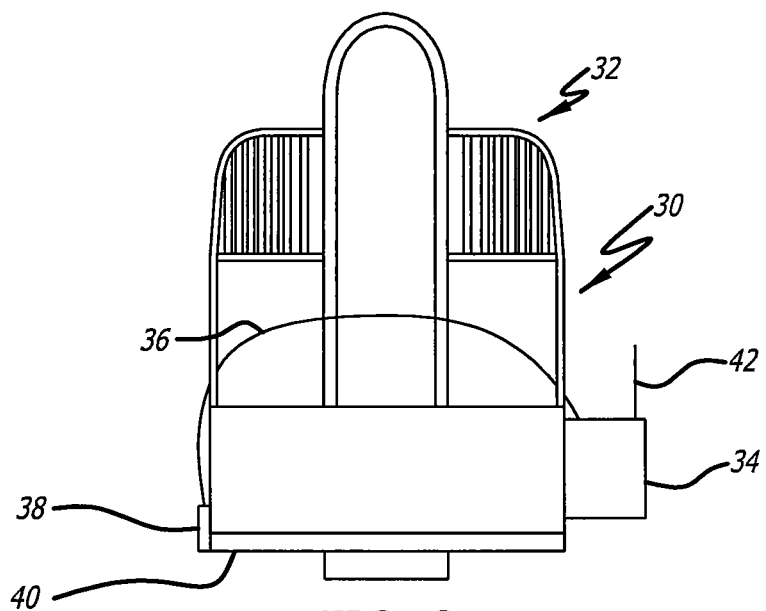
FIG. 2 is a diagram of a front view of the amusement ride seat of FIG. 1 with the patron restraint system according to the invention.
Figure 3:
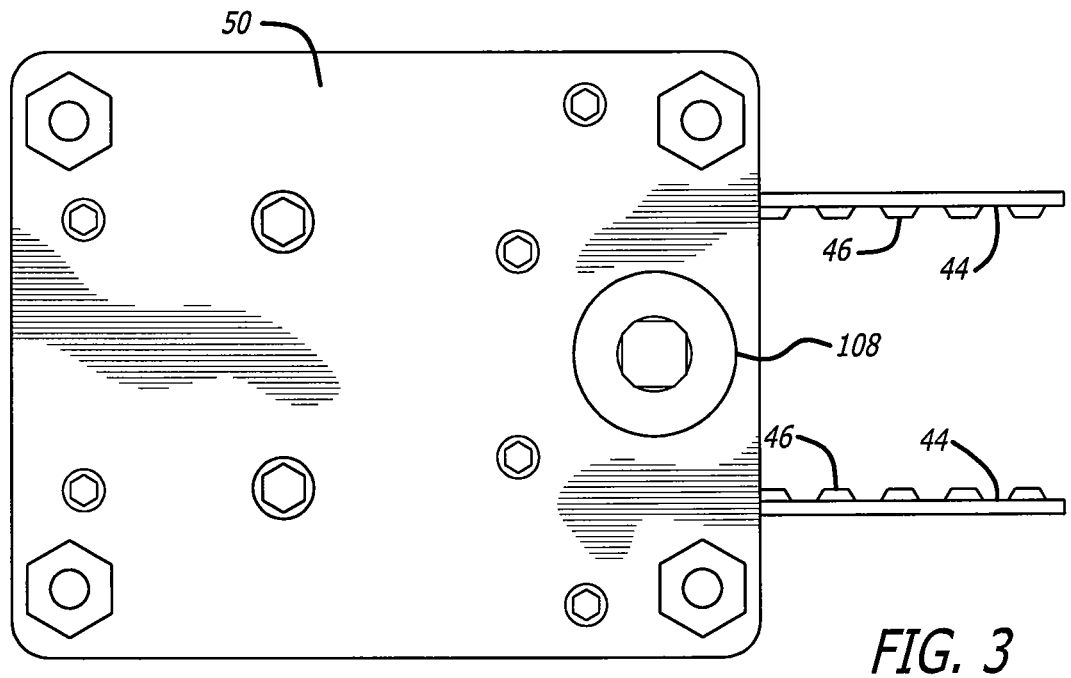
FIG. 3 is a top plan view of a first embodiment of a locking receiver and restraining strap of the patron restraint system of FIG. 1.
Figure 4:
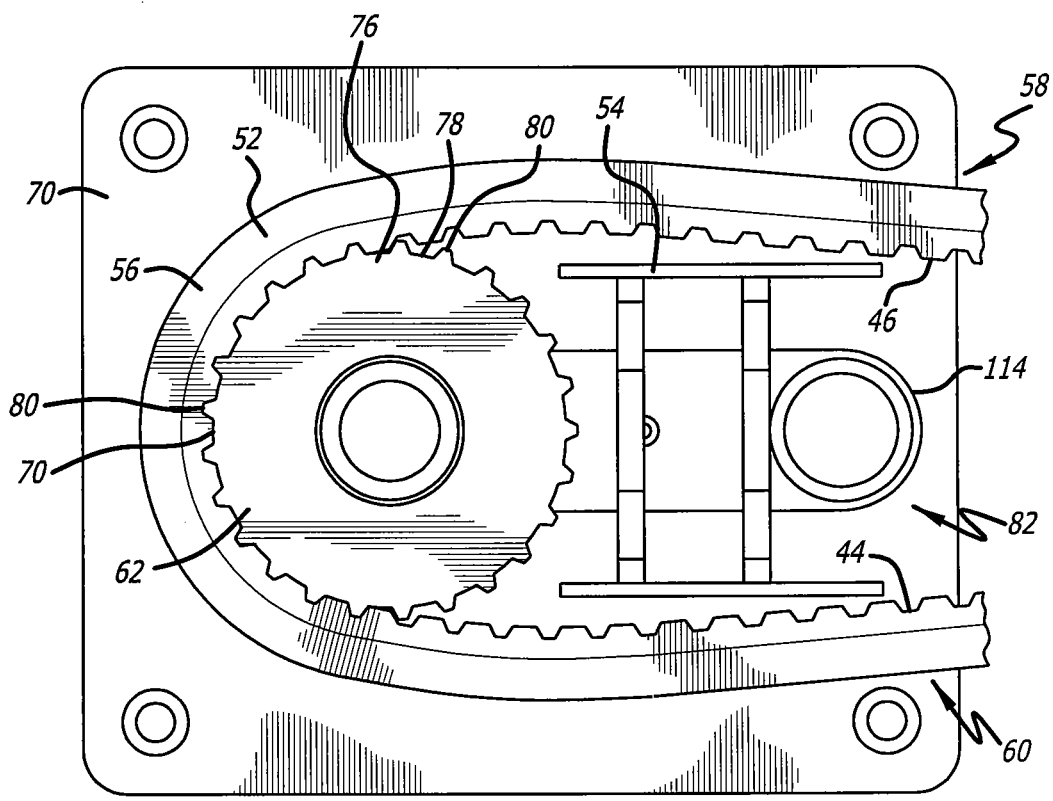
FIG. 4 is a top plan cutaway view of the locking receiver of FIG. 3, showing the locking elements in an engaged position.
Figure 5:
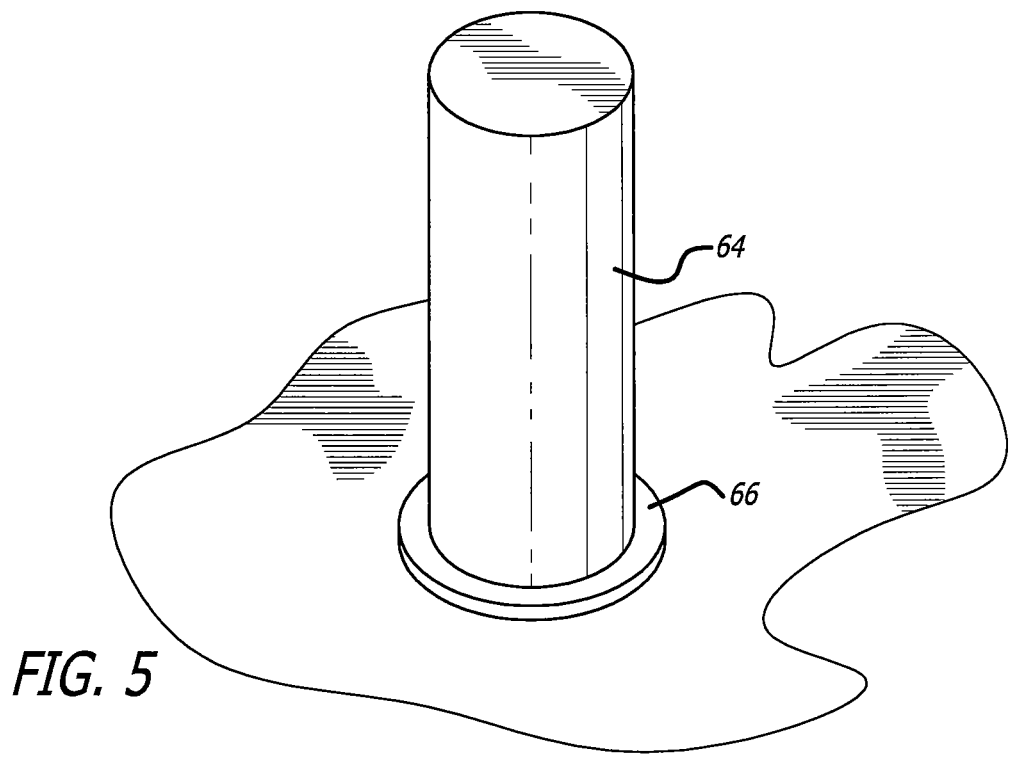
FIG. 5 is a perspective view of the cylindrical shaft for mounting the locking wheel or drum of the locking receiver of FIG. 3.

In a first presently preferred embodiment, with reference to FIGS. 1 and 2, the invention provides for a specialized patron restraint system 30 for a seat 32 of a vehicle of an amusement ride (not shown). The patron restraint system includes a locking receiver 34 for a flexible toothed or grooved restraining strap 36. The restraining strap has an anchored end 38 that is mounted to a frame 40 of the seat of the vehicle, and a free end 42 that is accessible to a rider for insertion in the locking receiver. In one presently preferred aspect, the restraining strap is made of heavy duty plastic, typically polyurethane with a steel wire rope or woven Kevlar rope tension member embedded into the polyurethane, for example, although other high strength, flexible, abrasion resistant plastics that resist stretching or deformation under load under all environments including but not limited to oil and water, may also be suitable. Referring to FIGS. 3 and 4, the restraining strap preferably has a plurality of notches or grooves 44 and a plurality of teeth 46 on at least one side of the restraining strap. The free end of the restraining strap is typically colored in one or more bands 48, shown in FIG. 1, so that it can be readily identified visually by the ride operator, as will be further explained below.

Figure 10:
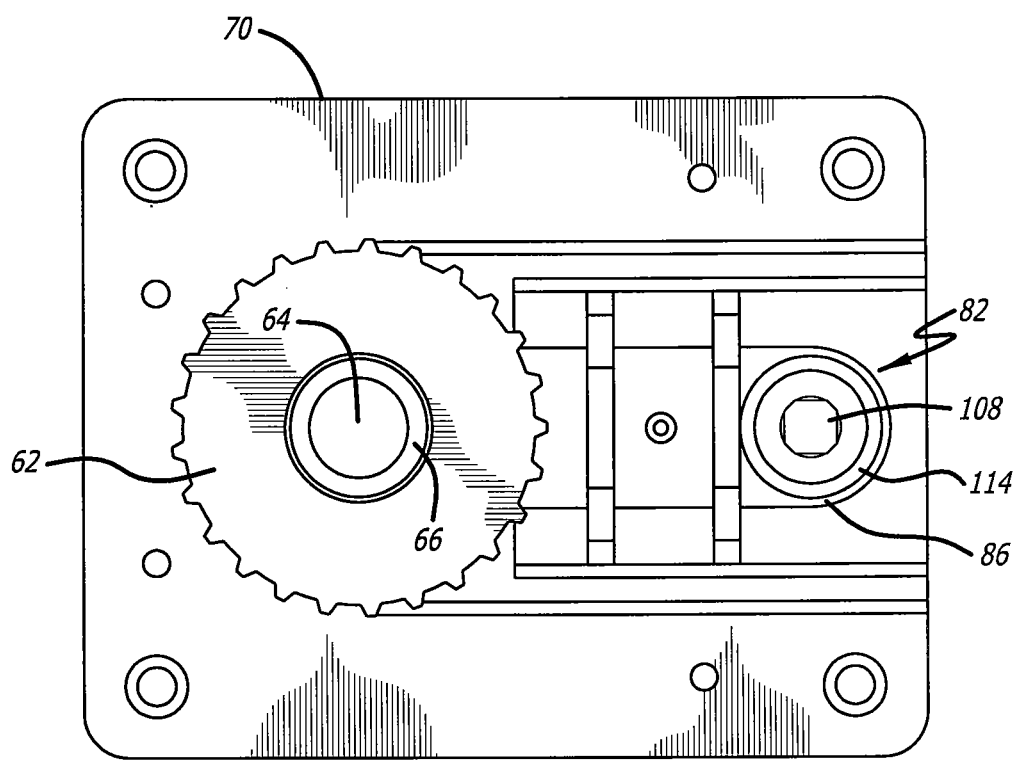
FIG. 10 is a top cutaway view of the locking receiver of FIG. 3, shown with the guide walls removed for clarity, and showing the locking elements in a released position.
Figure 11:
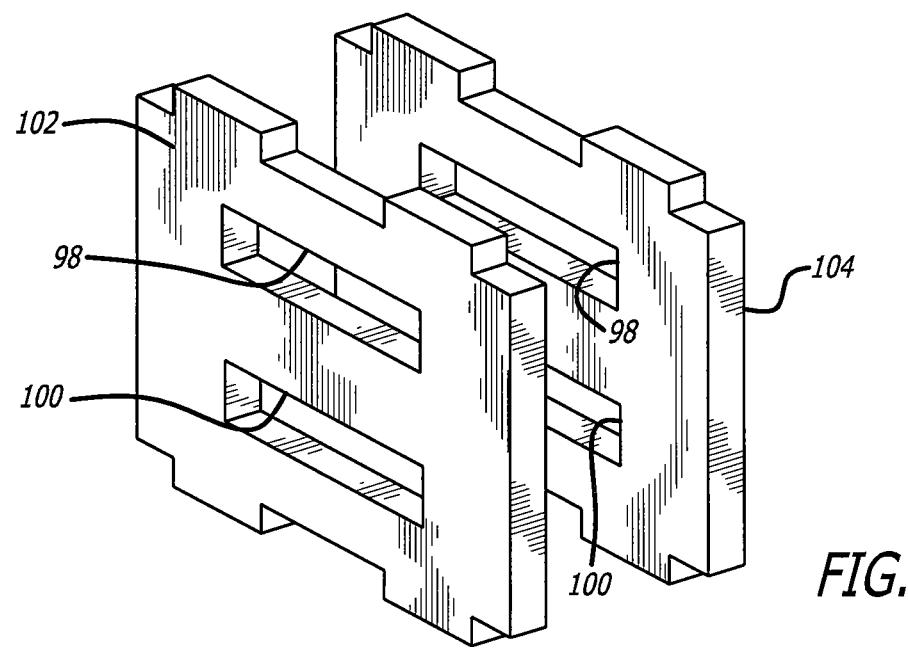
FIG. 11 is a perspective view of the first and second mounting plates for the locking elements of the locking receiver of FIG. 3.
Figure 12:
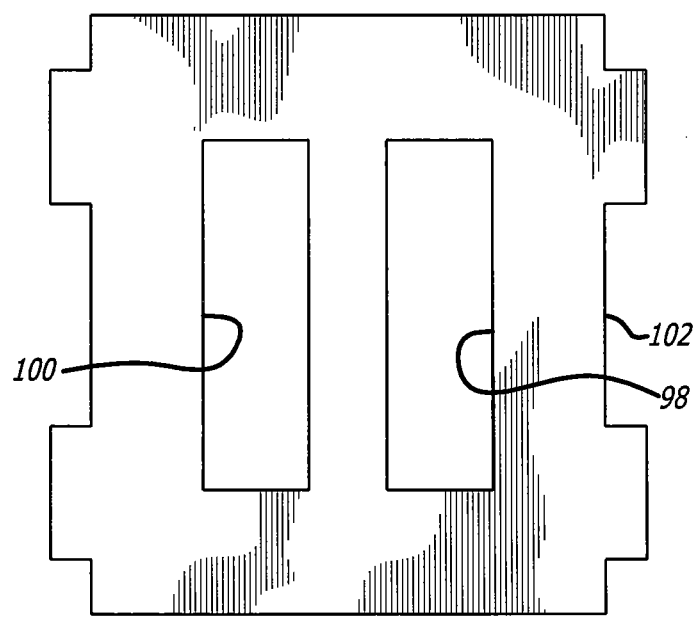
FIG. 12 is a front elevational view of a mounting plate for the locking elements of the locking receiver of FIG. 3.

Referring to FIGS. 3-8, the locking receiver includes a housing 50 containing first and second adjacent guide walls 52, 54 defining a restraining strap channel 56 therebetween, typically having the form of a U-shaped loop for receiving the restraining strap, with an entry opening or aperture 58 at one end of the channel, and an exit opening or aperture 60 at the other end of the channel. When the restraining strap is inserted in the locking receiver, the guide walls guide the restraining strap through the channel about a cylindrical locking wheel or drum 62 rotatably mounted on a cylindrical shaft or pin 64, typically with washers 66, between first and second end plates 68, 70 of the housing, shown in FIGS. 4, 6 and 7. In one presently preferred aspect, the cylindrical shaft or pin has at least one notched end 72 with a notch or flange 74, and one of the plates (70) of the housing has a recess 75 with a corresponding shape for receiving the notched end of the shaft or pin to prevent the shaft or pin from rotating. Referring to FIGS. 4 and 10, the locking wheel or drum advantageously has an outer cylindrical surface 76 defining a plurality of notches or grooves 78 and teeth 80 corresponding to the notches or grooves and teeth of the restraining strap, for engaging the restraining strap.

Figure 6:
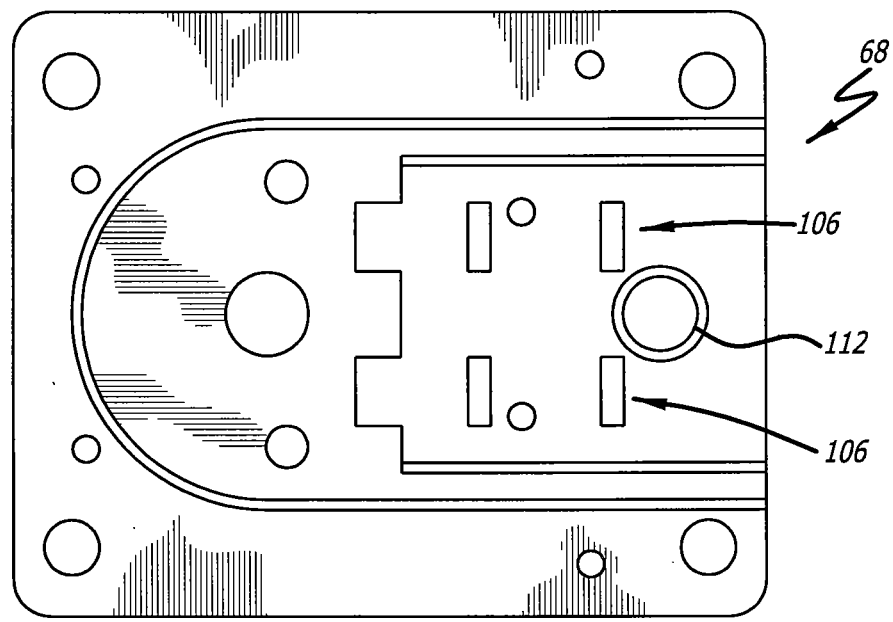
FIG. 6 is a plan view of a first end plate of the housing of the locking receiver of FIG. 3.
Figure 7:
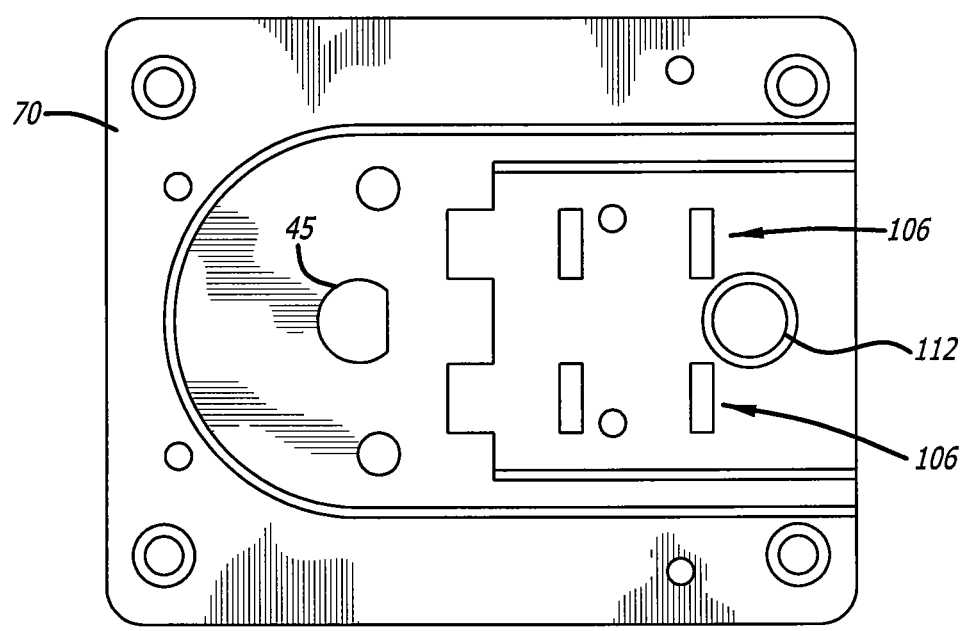
FIG. 7 is a plan view of a second end plate of the housing of the locking receiver of FIG. 3.
Figure 8:
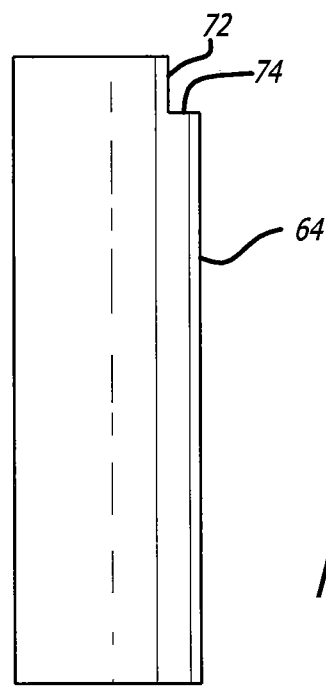
FIG. 8 is a side elevational view of the cylindrical shaft for mounting the locking wheel or drum of the locking receiver of FIG. 3.
Figure 9:
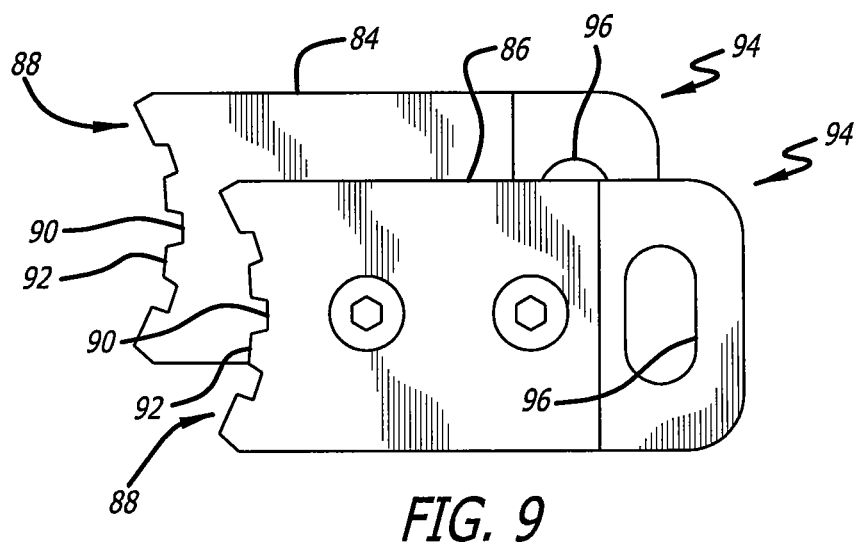
FIG. 9 is a top plan view of the first and second locking plates of the locking receiver of FIG. 3.
Figure 13:
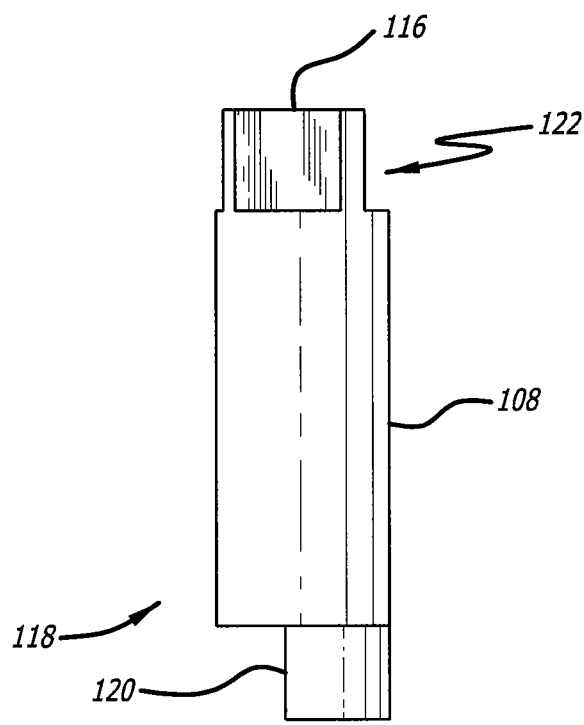
FIG. 13 is a side elevational view of a cam pin of the locking receiver for the locking elements of the locking receiver of FIG. 3.
Figure 14:
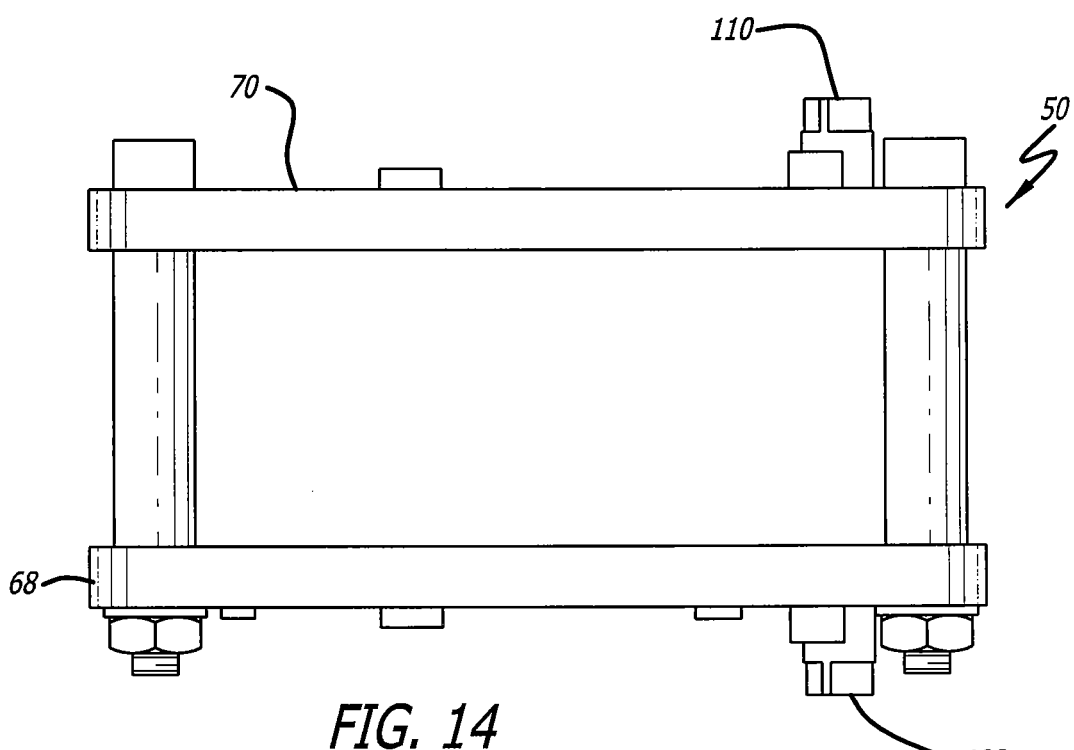
FIG. 14 is a side elevational view of the locking elements of the locking receiver of FIG. 3, showing a cam pin in a released position.
Figure 15:
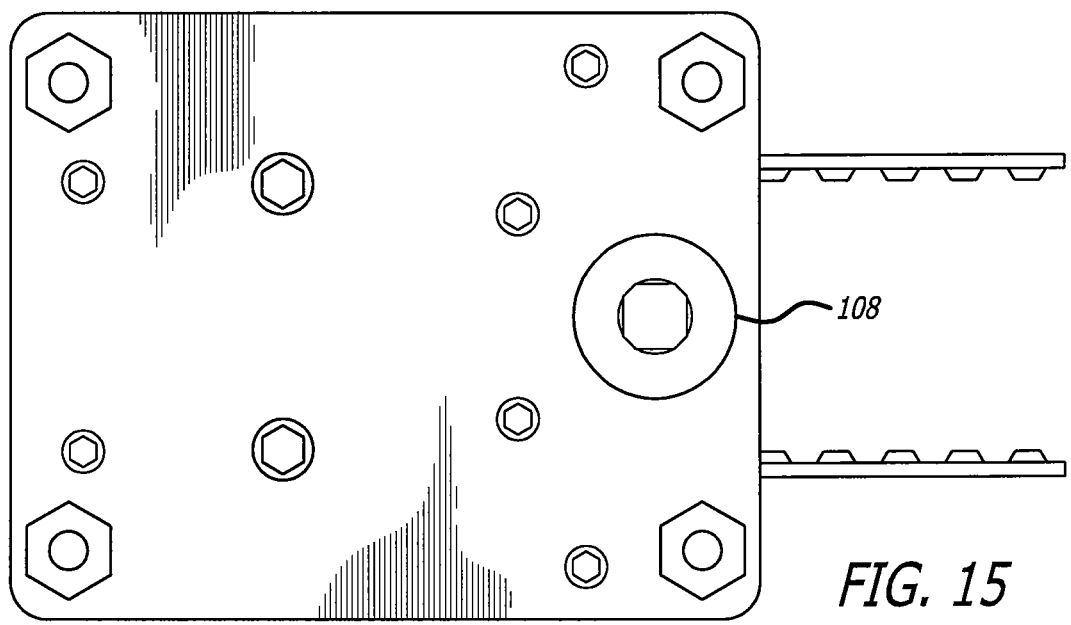
FIG. 15 is a side elevational view of the locking elements of the locking receiver of FIG. 3, showing a cam pin in an engaged position.

With reference to FIGS. 4 and 9-12, the locking receiver also preferably includes a locking assembly 82 including first and second locking elements 84, 86 mounted in the housing for engaging the locking wheel or drum to prevent rotation of the locking wheel or drum and movement of the restraining strap in an engaged position, shown in FIG. 4, and for releasing the locking wheel or drum to permit rotation of the locking wheel or drum and movement of the restraining strap in a released position, shown in FIG. 10. In a presently preferred aspect, the first and second locking elements are first and second locking plates each having a first end 88 with a surface defining a plurality of notches or grooves 90 and teeth 92 corresponding to the notches or grooves and teeth of the restraining strap for engaging the restraining strap, and a second end 94 having a cam aperture 96. The first and second locking plates are slidably mounted in first and second slots 98, 100 of first and second mounting plates 102, 104 for slidable movement between an engaged position shown in FIG. 4 and a released position shown in FIG. 10. Referring to FIGS. 6 and 7, the first and second mounting plates are mounted in slots 106 between the first and second end plates of the housing. First and second cylindrical cam pins 108, 110, shown in FIGS. 13 and 14, are rotatably received in apertures 112, shown in FIGS. 6 and 7, in the first and second end plates, extending through first and second generally tubular sliding spacers 114 disposed between the first and second locking plates and the first and second end plates of the housing, respectively. Each cylindrical cam pin has a longitudinal axis 116 and includes a first end 118 with a cylindrical distal tip 120 that is offset radially outwardly from the longitudinal axis, and that is received in the cam aperture of a locking plate. The other end 122 of each of the cam pins typically has a geometric configuration, such as a squared or hexagonal end, for example, for engaging a lever or other means (not shown) for rotating the cam pin between an engaged position shown in FIG. 15 and a released position shown in FIG. 3, so that the cam pin can be operated manually by the ride operator or remotely from an operator control console, for moving the locking plates between the engaged and released positions.

Figure 16:
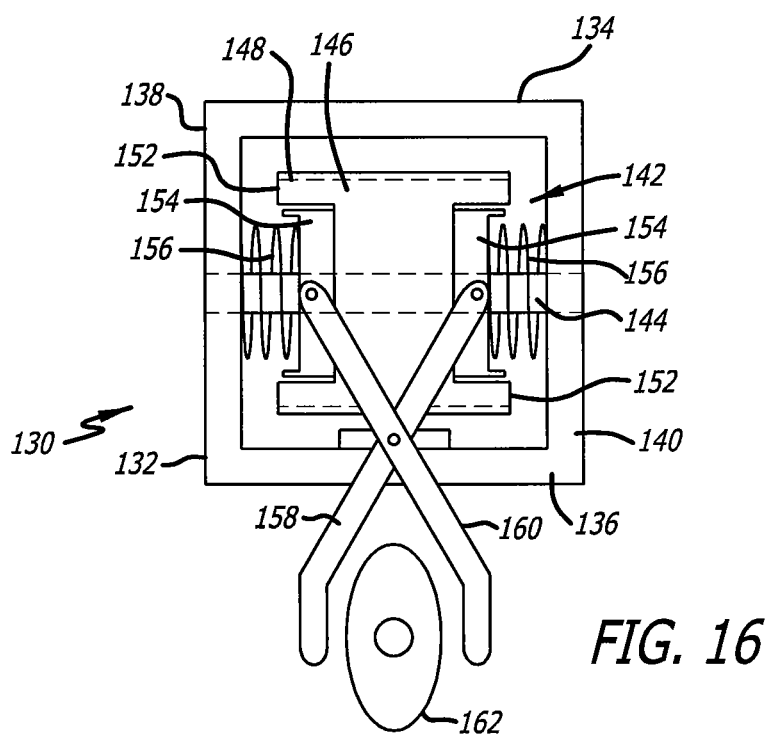
FIG. 16 is a schematic diagram of the ratchet mechanism of the locking receiver of FIG. 3.

In a first presently preferred variation of the first embodiment illustrated in FIG. 16, the invention provides for a locking receiver 130 enclosed in a housing 132 made up of a top plate 134, a bottom plate 136, and two rectangular end blocks 138, 140, which provide a constraint for the slidable, non-rotating, locking ratchet mechanism 142. The two rectangular end blocks are attached to the top plate and the bottom plate. The two rectangular end blocks act as a support for the axial shaft 144 that extends through the cylindrical locking wheel 146 rotatably mounted inside the housing. The cylindrical locking wheel has grooves or teeth 148 that are configured to engage the mating grooves or teeth of the flexible passenger restraint strap 36, as described above. One or both sides 152 of the cylindrical locking wheel have the mating section 154 of the locking ratchet mechanism mounted to it. This is necessary so it can be used as a single or redundant locking receiver to accommodate all levels of passenger restraint requirements. Axial compression springs 156 are used to move the fixed locking ratchet mechanism into position to engage the fixed and rotatably mounted locking ratchet mechanism. When the fixed and rotatable members of the locking ratchet system are engaged, the cylindrical locking wheel can rotate in one direction to allow for securing and tightening the flexible passenger restraint means. Unlocking of the receiver is accomplished by the use of cam actuated levers 158, 160 mounted to one or both sides of the housing operated by rotation of a cam 162 by a ride operator, whether by physically releasing the patron restraint system by pressing a mechanically connected release mechanism on the ride, or by pushing a RESTRAINT OPEN button, or by turning a RELEASE OPEN switch on the ride control panel, so that the restraints are then automatically released when the ride is verified to be in a Load/Unload position; although other methods for opening the levers could be used, such as an auto-open air bladder or double acting pneumatic cylinder or solenoid, for example. These cam actuated levers disengage the fixed locking ratchet element from contact with the rotatable locking ratchet element that is mounted to the toothed or grooved cylindrical locking wheel, thus allowing the flexible passenger restraint to be withdrawn from the receiver. An indicator flag (not shown) would be visible to the ride operator through a port or opening in the housing to visually indicate that the locking ratchet system is in the locked position. A single or redundant sensor system as described hereinbelow may also be applied to this type of locking receiver. In the event of an emergency the receiver can be unlocked manually by the ride operator or emergency personnel by pressing a release lever that is positioned out of the reach envelope of the passengers.

Figure 17A:
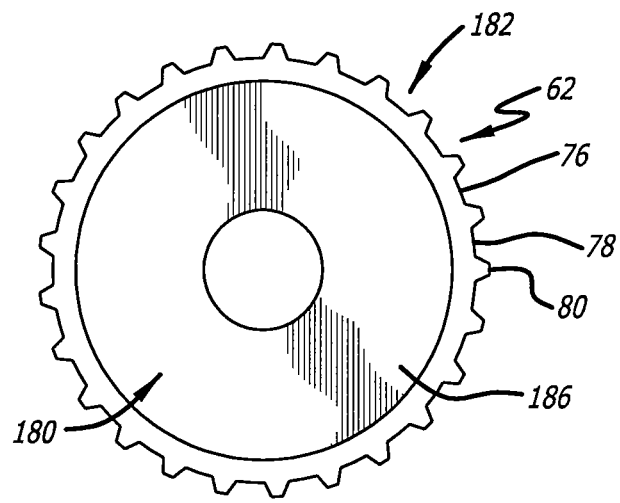
FIG. 17A is a top plan view of a variation of the locking wheel or drum of the locking receiver of FIG. 3, with a ratchet mechanism.
Figure 17B:
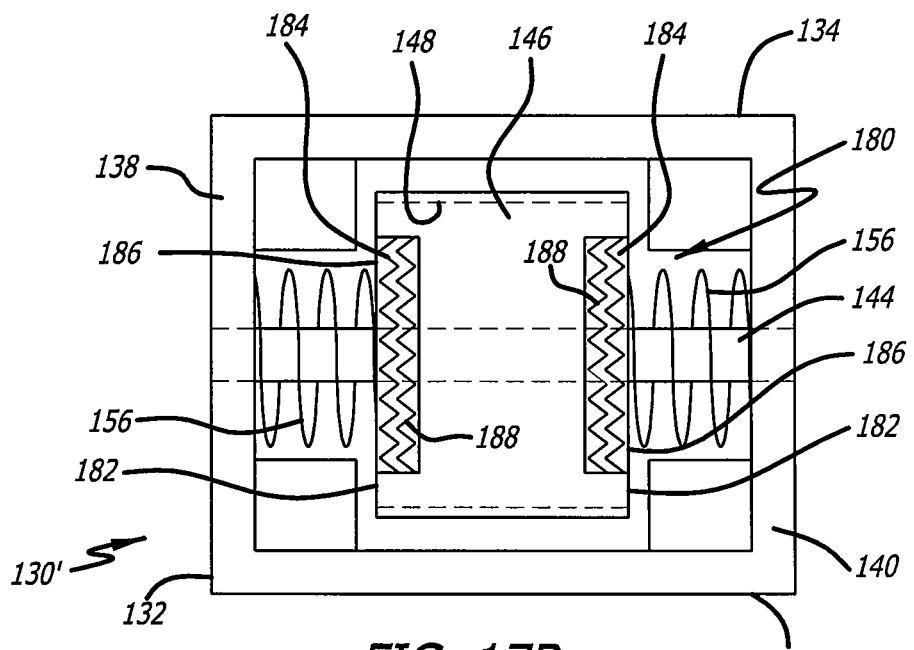
FIG. 17B is a schematic diagram of the ratchet mechanism of the locking receiver of FIG. 17A.
Figure 17C:
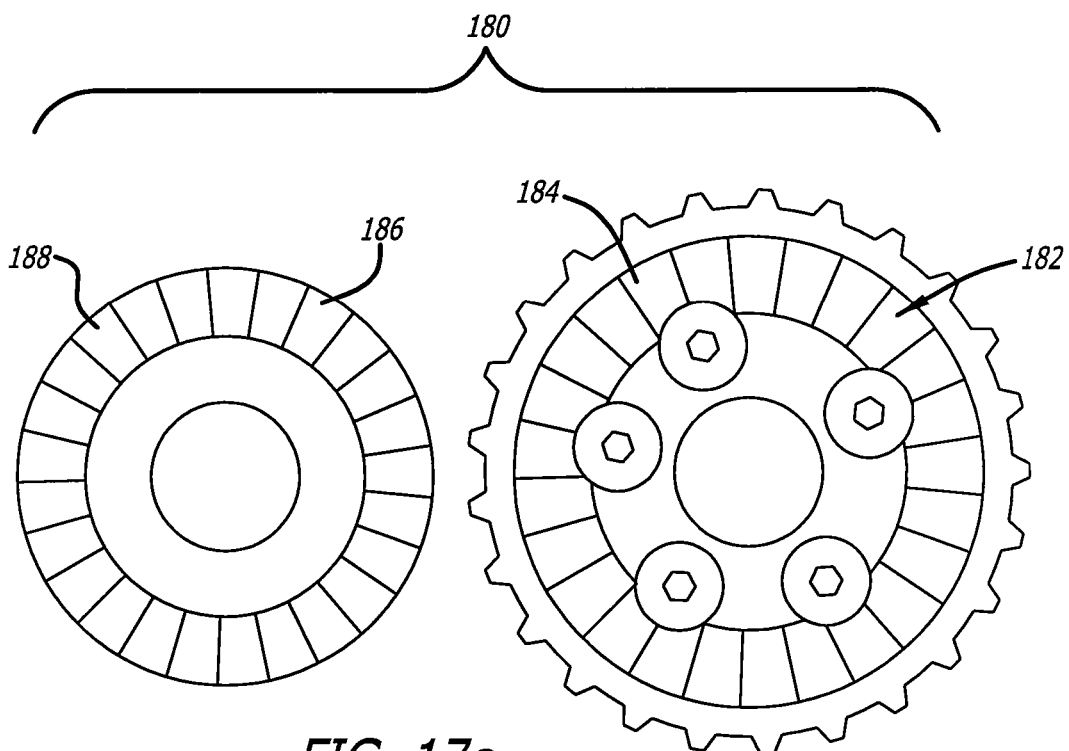
FIG. 17C is an exploded view of the ratchet mechanism of the locking wheel or drum of FIG. 17A.

As is illustrated in FIGS. 17A-17C, in a second variation of the first embodiment, a latching unidirectional ratchet mechanism 180 may additionally be provided in the locking wheel or drum 146 of a locking receiver 130' to further restrict the restraining strap to movement in one direction to tighten the restraining strap and prevent movement of the restraining strap in the opposite direction to loosen the restraining strap, so that the restraining strap remains in place and can not be loosened or disengaged from the receiver until it is released by the ride operator, whether by physically releasing the patron restraint system by pressing a mechanically connected release mechanism on the ride, or by pushing a RESTRAINT OPEN button, or by turning a RELEASE OPEN switch on the ride control panel, so that the restraints are then automatically released when the ride is verified to be in a Load/Unload position. For example, one or both of the planar sides 182 of the locking wheel or drum may be provided with a plurality of ratchet teeth 184, and a circular plate or disk 186 having a corresponding plurality of ratchet teeth 188 adapted to mate with the ratchet teeth of the locking wheel or drum may be rotatably mounted on the cylindrical shaft of the locking wheel or drum over the ratchet teeth of one or both of the planar sides of the locking wheel or drum. Each circular plate can be mounted for reciprocal movement into and out of engagement with the ratchet teeth of the locking wheel or drum under control of the ride operator. Thus, while the a rider is inserting the restraining strap in the locking receiver, and when the locking elements of the locking receiver are engaged, the ratchet mechanism can be engaged by the ride operator, and when the ride cycle is complete, the ratchet mechanism can be released by the ride operator along with the locking elements to allow the rider to exit the ride, whether by physically releasing the patron restraint system by pressing a mechanically connected release mechanism on the ride, or by pushing a RESTRAINT OPEN button, or by turning a RELEASE OPEN switch on the ride control panel, so that the restraints are then automatically released when the ride is verified to be in a Load/Unload position.

Figure 18:
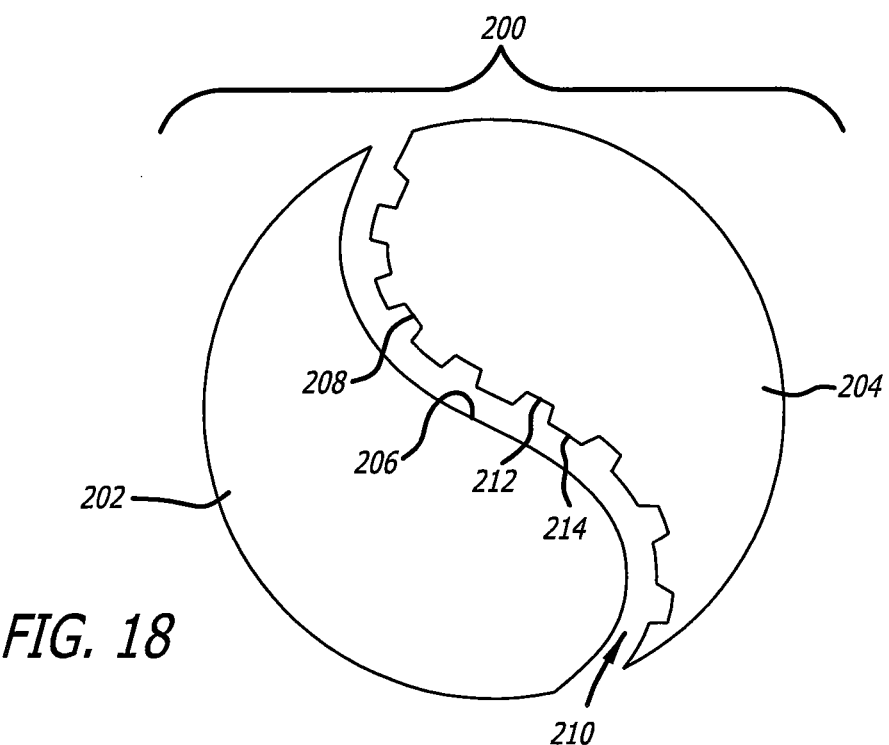
FIG. 18 is a sectional diagram of a second embodiment of a locking assembly for a locking receiver of a patron restraint system according to the invention.

In a second presently preferred embodiment, the invention provides for a patron restraint system for a seat of a vehicle of an amusement ride (not shown), and the patron restraint system includes a flexible toothed or grooved restraining strap 36, as described above. The free end of the restraining strap can be inserted into a locking receiver such as is described above, but having a housing containing a locking assembly 200, shown in FIG. 18, formed of first and second mating sections 202, 204, each having an "S" shaped, sigmoid or sinusoidal shaped restraining strap engaging surface 206, 208, and defining an "S" shaped, sigmoid or sinusoidal shaped slot or channel 210 therebetween. At least one of the restraining strap engaging surfaces defines a plurality of notches or grooves 212 and teeth 214 corresponding to the plurality of notches or grooves and teeth of the restraining strap, for engaging the restraining strap. At least one of the two mating sections of the locking assembly is slidably mounted in a housing of the locking receiver for movement toward the other of the two mating sections to trap a restraining strap inserted into the slot or channel between them, and to exert pressure on the restraining strap to prevent disengagement of the restraining strap, and for movement away from the other of the two sections to release the restraining strap.

Figure 19:
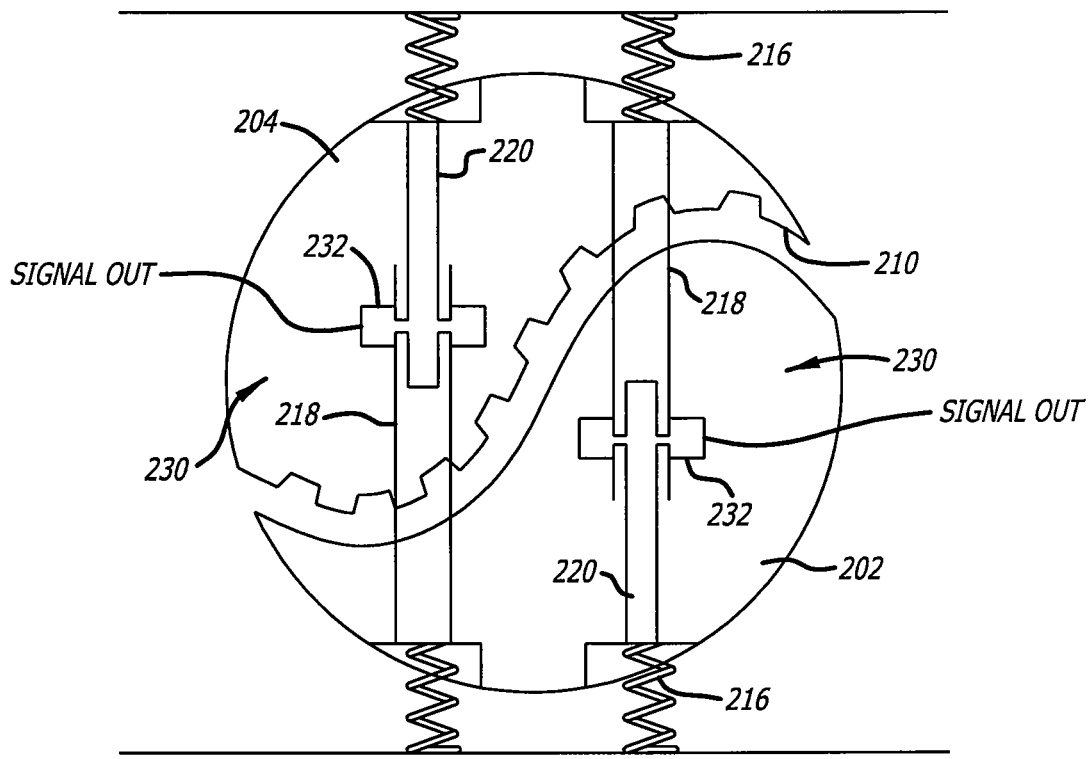
FIG. 19 is another sectional diagram of the locking assembly of FIG. 18, showing guide elements and alignment sensors of the locking assembly.
Figure 20:
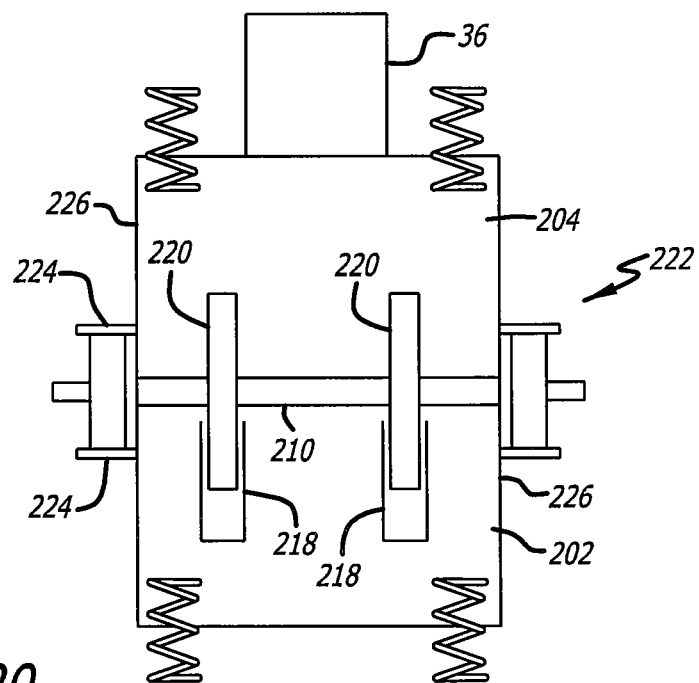
FIG. 20 is a diagram showing a cam assembly for moving the sections of the locking assembly into a released position.

Referring to FIGS. 19 and 20, in a presently preferred aspect, compression springs 216 may be mounted in the housing to bias at least one of the two sections into engagement with the other. In a presently preferred aspect, each of the two mating sections is slidably mounted in the housing for movement toward and away from the other, with each of the two mating sections including two slot guides 218 and corresponding guide pins 220 operatively arranged in sliding relation for guiding the sliding movement of the two mating sections with toward and away from each other, with Elgiloy compression springs mounted in the housing adjacent to each of the two sections to bias the two sections into engagement. A cam device 222 under control of the operator may be provided on the exterior planar sides of the two mating sections between cam arms 224 mounted to the exterior planar sides 226 of the two mating sections for alternately engaging and releasing the two mating sections of the locking assembly. Whereas a restraining strap placed over an outer portion of a locking wheel or drum may typically engage less than half of the circumference of the locking wheel or drum, by engaging the restraining strap with such a locking assembly having mating sections with "S" shaped, sigmoid or sinusoidal shaped restraining strap engaging surfaces as is described above, the restraining strap can be engaged over a distance that is greater than or equal to half of the exterior circumference of a comparable locking wheel or drum to reduce the possibility of unanticipated disengagement.

The locking receiver may also be provided with a redundant sensor system 230 to detect whether the restraining strap is properly engaged. Sensors 232 may be placed in the slot guides 218 at appropriate locations adjacent to the guide pins 220 for detecting engaged and released positions of the guide pins, as well as non-optimal alignment of the guide pins. The sensors preferably should be should be very fault-tolerant, and should be unaffected by dust, dirt and moisture. A sensor also may be provided in the receiver to detect insertion of the restraining strap in the receiver.

Figure 21:
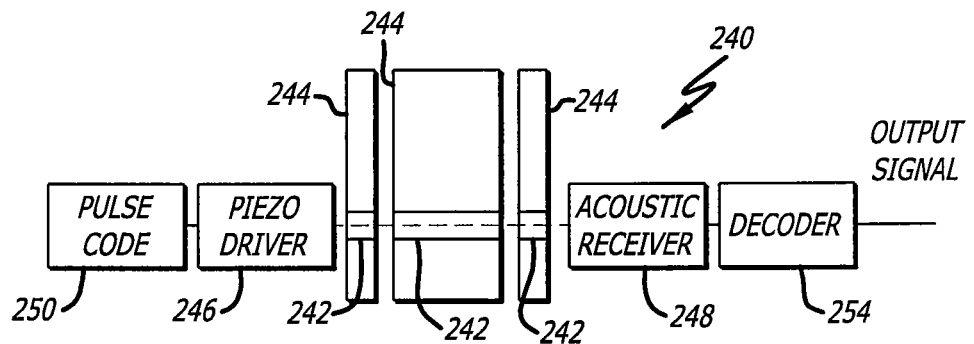
FIG. 21 is a schematic diagram of an acoustic sensor system of the locking assembly of FIG. 19.
Figure 22:
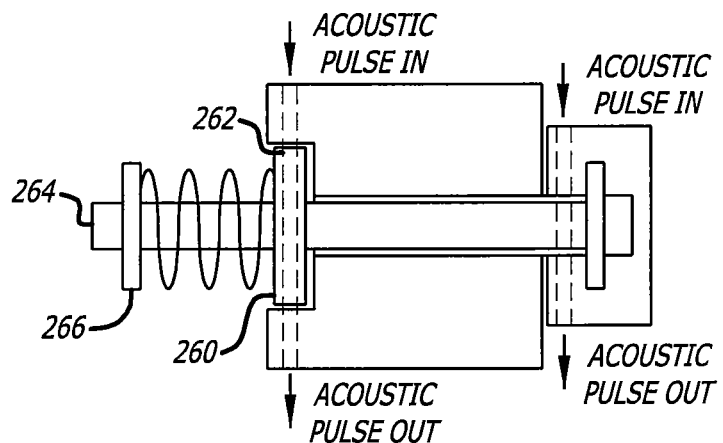
FIG. 22 is a diagram of an acoustic sensor system for the locking assembly of FIG. 19.
Figure 23:
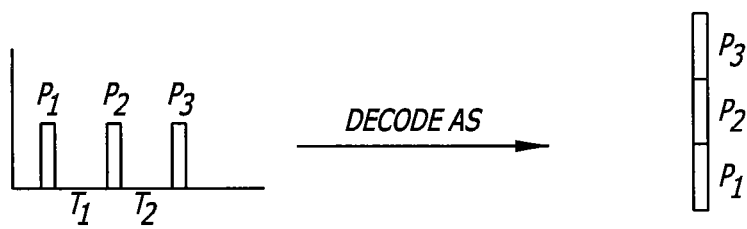
FIG. 23 is a diagrammatic representation of the timed pulse codes generated and detected by the acoustic sensor system of the locking assemblies of FIG. 19.
Figure 24:
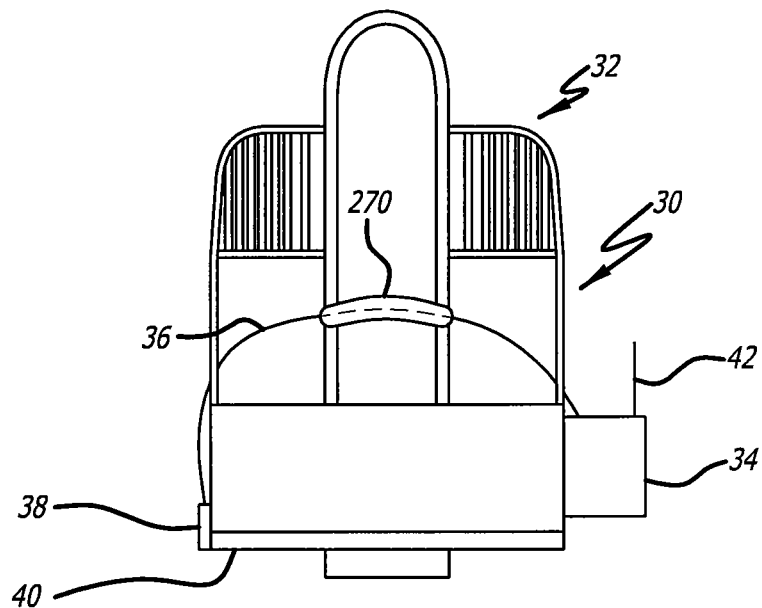
FIG. 24 is a diagram of a front view of the amusement ride seat of FIG. 1 with a variation of the patron restraint system of the invention including a restraining strap pad adapted to overly a patron's lap or torso.

Referring to FIGS. 21-23, in a presently preferred aspect, the sensor system may be an acoustic sensor system 240 that detects a proper alignment of a plurality of apertures or windows 242 provided in a plurality of slidably or rotatably mounted plates 244, such that when the apertures or windows are moved into alignment, energy from a piezoelectric acoustic emitter 246 is permitted to reach an acoustic detector 248 such as a piezoelectric sensor, for example. If any one aperture or window is not in alignment, the sonic energy and consequently a correct output signal from the detector will be blocked, and correct positioning of the guide pins will not be detected.

The configuration of the sensors is typically such that a "low" output indicates a "not-engaged" or "not-present" condition. This configuration is fail-safe in that if a sensor becomes defective it reports a "not-engaged" or "not-present" response to the controlling device. The ride is shown to be in a "READY" state when indicators report that the locking receivers of all seats are locked, and optionally also that the restraining straps are all inserted in the locking receivers. The ride operator can observe that the locking receivers at each seat are engaged by observing the "READY" indication on an operator control console (OCC). When the ride operator observes the "READY" indicator on the OCC, the ride operator can then start the ride cycle by pressing the "RIDE START" button on the OCC. At the end of the ride cycle the ride operator manually or automatically releases the locking elements in the locking receivers so that the restraining straps can be extracted from the receivers, and the riders can then exit the ride.

By using a plurality of time-delayed pulses of sonic energy, such as three time-delayed pulses, for example, and a decoder with a threshold detector in the acoustic detector, random or non-synchronized noise can be filtered out, and will not cause triggering of an output of an alignment signal. This system is immune to high levels of noise due to thresholding a uniquely timed pulse triplet. In the sensor system for the safety restraint, the required pulse group could be generated using a piezoelectric emitter driven by a pulse-code generator 250. The receiver can be implemented by a piezoelectric sensor 252 that generates a voltage output proportional to the acoustic input. A decoder 254 receiving the output from the piezoelectric sensor can be set to sequentially separate the three unique time coded pulses $P_1$, $P_2$, $P_3$, with intervals of time $T_1$, $T_2$ between them, from random noise. By properly selecting the acoustic pulses in a shape resembling a soliton wave and designing the acoustic transmission apertures or windows to act as a channel for the soliton wave, the effects of dust, dirt, moisture and lubricant contamination, which might otherwise reduce signal level at the detector can significantly reduced.

Referring to FIG. 22, a lock plate 260 with an aperture or window 262 therethrough may be fixed to a sliding guide with a shaft 264 telescopically mounted in sliding relationship with a fixed plate or guide 266, aligned with an acoustic pulse emitter on one side of the aperture and an acoustic pulse detector aligned on the other side of the aperture when the locking wheel or drum is in an engaged or locked position, so that acoustic pulses will be conducted from the acoustic pulse emitter to the acoustic pulse detector only when the locking elements of the locking receiver are in a locked position. This system allows for redundant sensors for each of the guides to sense a locked or engaged condition and an unlocked or released condition of the locking receiver.

Figure 25:
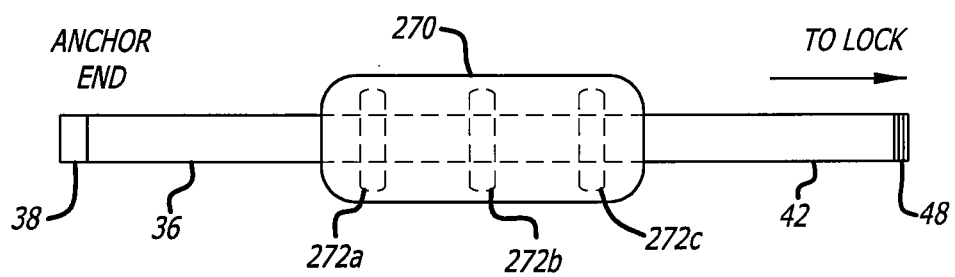
FIG. 25 is a top plan view of the restraining strap and restraining strap pad of FIG. 24.
Figure 26:
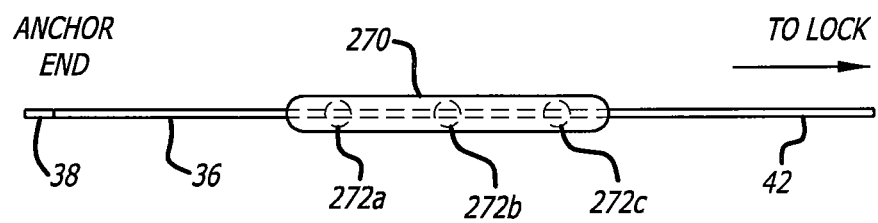
FIG. 26 is a side elevational view of the restraining strap and restraining strap pad of FIG. 24.

In another presently preferred aspect, as is illustrated in FIGS. 24-33, the restraining strap of the patron restraint system of the invention may include a restraining strap pad 270 molded or mounted onto the restraining strap at a location on the restraining strap such that the restraining strap pad is adapted to overly a patron's lap or torso when a patron is seated on the amusement ride seat with the restraining strap in place in the patron restraint system. As is shown in FIGS. 25 and 26, the restraining strap pad may include internal stiffening or reinforcement members 272*a*, 272*b*, 272*c* for shaping or stabilizing the structure of the restraining strap pad as may be required to suitably fit over a patron's lap or torso.

Figure 27:
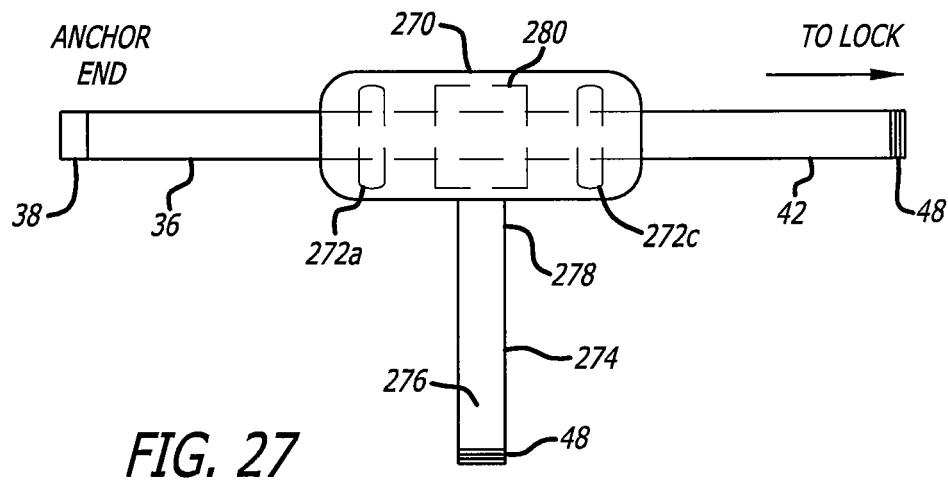
FIG. 27 is a top plan view of the restraining strap and restraining strap pad, including a crotch strap.
Figure 28:
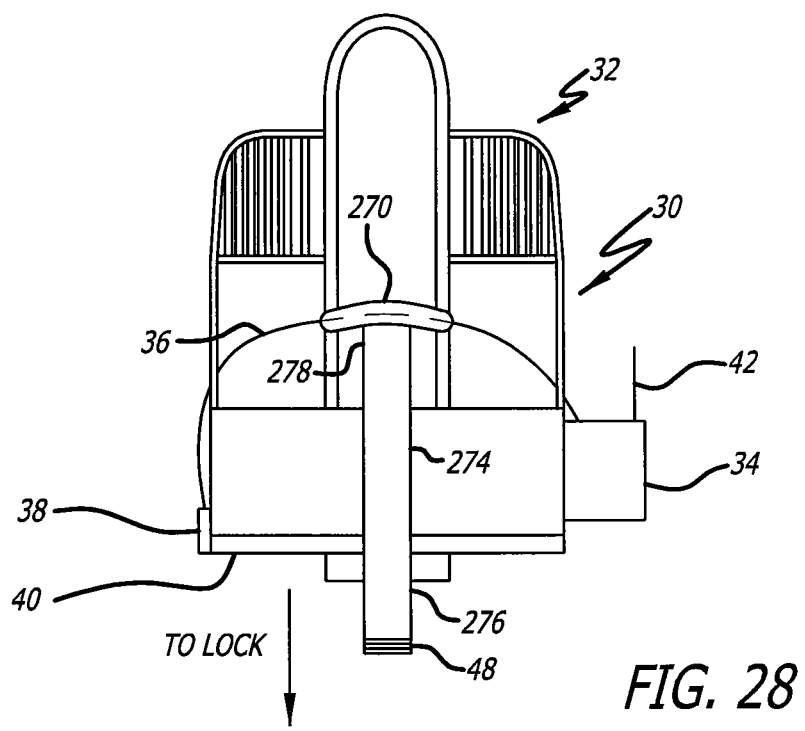
FIG. 28 is a diagram of a front view of the amusement ride seat of FIG. 1 and patron restraint system with the strap, restraining strap pad and crotch strap of FIG. 27.

Referring to FIGS. 27 and 28, the patron restraint system of the invention may also include a crotch strap 274 having a free end 276 adapted to be received in a locking receiver, and an opposing end 278 connected to the restraining strap 36 by a mechanical interface 280, such as within the restraining strap pad adapted to overly a patron's lap or torso.

Figure 29:
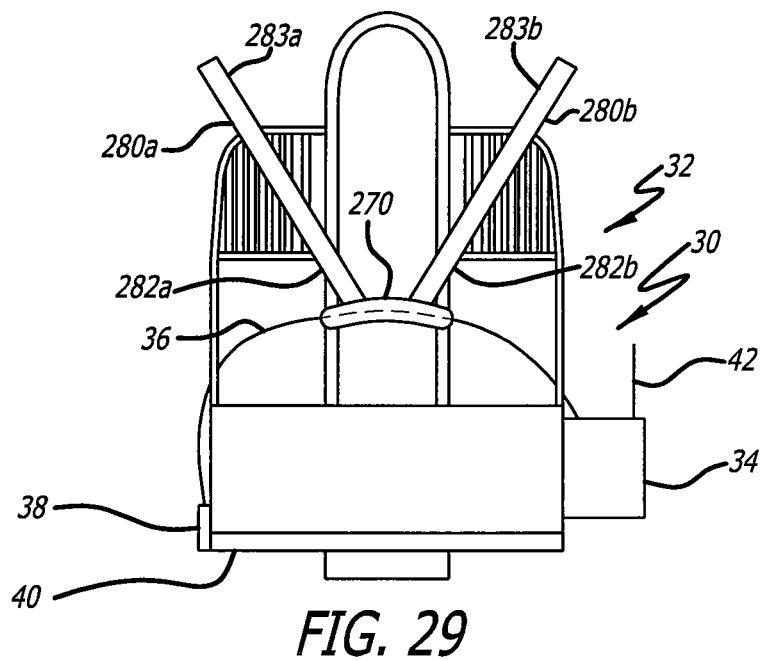
FIG. 29 is a diagram of a front view of the amusement ride seat and patron restraint system of FIG. 1 with the strap, restraining strap pad and shoulder straps.
Figure 30:
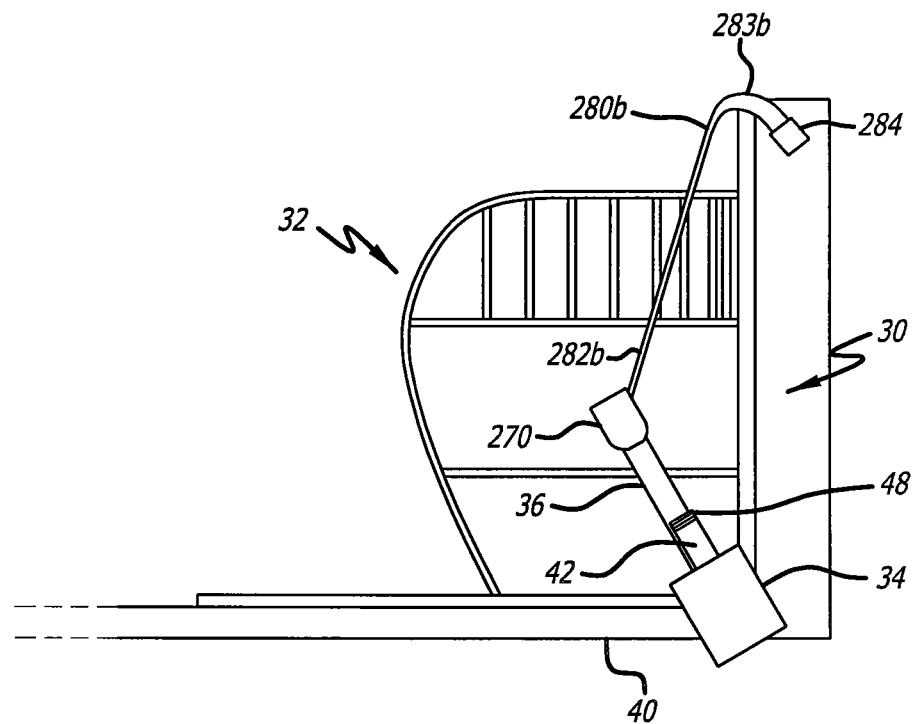
FIG. 30 is a side view of the amusement ride seat and patron restraint system of FIG. 29.
Figure 31:
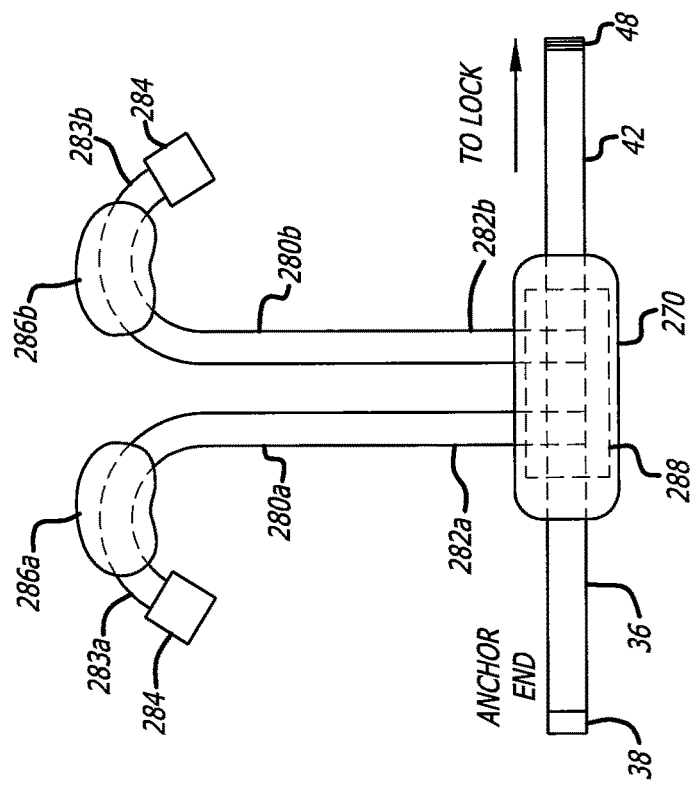
FIG. 31 is a diagram of a front view of the strap, restraining strap pad and shoulder straps of FIG. 29.
Figure 32:
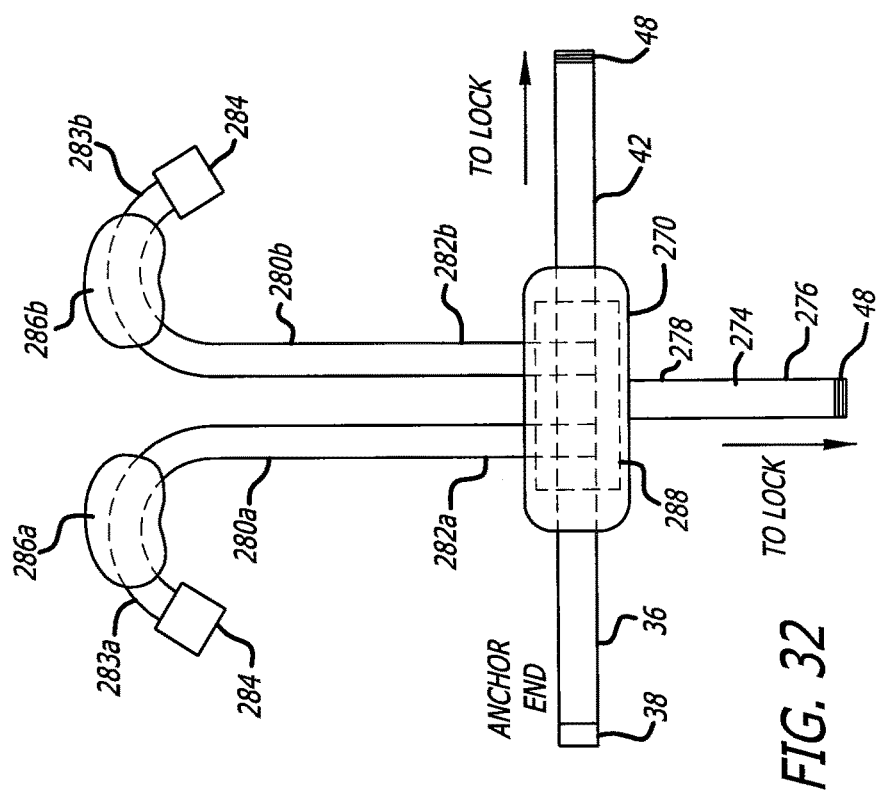
FIG. 32 is a diagram of a front view of the strap, restraining strap pad and shoulder straps, and including a crotch strap.
Figure 33:
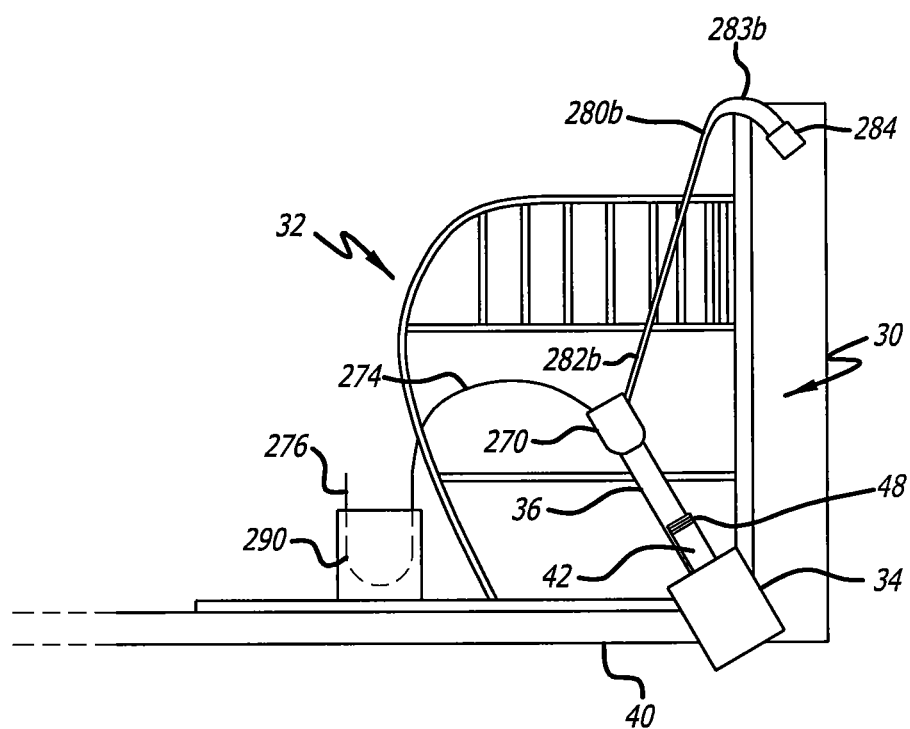
FIG. 33 is a side view of the amusement ride seat and patron restraint system with the strap, restraining strap pad, shoulder strap and crotch strap of FIG. 32.

Referring to FIGS. 29-31, the patron restraint system of the invention may also include one or a pair of left and right shoulder straps 280*a*, 280*b*, having ends 282*a*, 282*b* connected to the restraining strap 36 and opposing ends 283*a*, 283*b* connected to an anchor 284 mounted to a portion of the seat or vehicle. The shoulder straps may be connected to the restraining strap 36 by a mechanical interface 288, such as within the restraining strap pad adapted to overly a patron's lap or torso. Referring to FIGS. 31 and 32, the shoulder straps may also include shoulder pads 286*a*, 286*b* molded or mounted onto the shoulder straps at a location on the shoulder straps such that the shoulder pads are adapted to overly a patron's shoulder when a patron is seated on the amusement ride seat with the restraining strap and shoulder straps in place in the patron restraint system. As is illustrated in FIGS. 32 and 33, the patron restraint system may include the crotch strap and one or both shoulder straps connected to the restraining strap, such as within the restraining strap pad adapted to overly the patron's lap or torso by the mechanical interface 288, and such that the crotch strap is adapted to be received in another locking receiver 290, as shown in FIG. 33.

It will be apparent from the foregoing that while particular forms of the invention have been illustrated and described, various modifications can be made without departing from the spirit and scope of the invention. For example, it should be readily apparent that while the foregoing description has referred to one cylindrical locking wheel or drum rotatably mounted on a cylindrical shaft, two or more coaxial cylindrical locking wheels or drums or sections may be rotatably mounted on the same shaft, with each of the locking wheels or drums or sections having its own locking means. Accordingly, it is not intended that the invention be limited, except as by the appended claims.

We claim:

1. An acoustic sensor system for use in a patron restraint system having a locking assembly, comprising:
   an acoustic emitter for emitting acoustic energy;
   an acoustic detector for sensing said acoustic energy and outputting a detection signal in response to said acoustic energy; and
   at least one movable alignment element interposed between said acoustic emitter and said acoustic detector, said at least one movable alignment element including an acoustic transmission window extending therethrough, said at least one movable alignment element being slidably mounted in the locking assembly to be movable into and out of alignment with said acoustic emitter and said acoustic detector such that when said acoustic transmission window is moved into alignment with said acoustic emitter and said acoustic detector, said acoustic energy from said acoustic emitter is received by said acoustic detector.

2. The acoustic sensor system of claim 1, wherein said at least one movable alignment element comprises a plurality of alignment plates.

3. The acoustic sensor system of claim 1, wherein said at least one movable alignment element comprises a lock plate with an acoustic transmission window therethrough interposed between said acoustic emitter and said acoustic detector, said lock plate being fixed to a sliding shaft telescopically mounted in sliding relationship with a guide mounted to the locking assembly such that said acoustic transmission window is movable into and out of alignment with said acoustic emitter and said acoustic detector, and such that when said acoustic transmission window is moved into alignment with said acoustic emitter and said acoustic detector, said acoustic energy from said acoustic emitter is received by said acoustic detector.

4. The sensor system of claim 3, wherein said acoustic emitter is an acoustic pulse emitter, said acoustic detector is an acoustic pulse detector, and said lock plate is aligned with said acoustic pulse emitter on one side of said acoustic transmission window and said acoustic pulse detector on the other side of the acoustic transmission window when the locking assembly is in an engaged position.

5. An acoustic sensor system for use in a patron restraint system having a locking assembly, comprising:
- an acoustic emitter for emitting acoustic energy;
- an acoustic detector for sensing said acoustic energy and outputting a detection signal in response to said acoustic energy; and
- at least one movable alignment element interposed between said acoustic emitter and said acoustic detector, said at least one movable alignment element including an acoustic transmission window extending therethrough, said at least one movable alignment element being rotatably mounted in the locking assembly to be movable into and out of alignment with said acoustic emitter and said acoustic detector such that when each said acoustic transmission window is moved into alignment with said acoustic emitter and said acoustic detector, said acoustic energy from said acoustic emitter is received by said acoustic detector.

6. The acoustic sensor system of claim 5, wherein said at least one movable alignment element comprises a plurality of alignment plates.

7. The acoustic sensor system of claim 5, wherein said at least one movable alignment element comprises a lock plate with an acoustic transmission window therethrough interposed between said acoustic emitter and said acoustic detector, said lock plate being fixed to a rotatable shaft mounted in rotatable relationship with a guide mounted to the locking assembly such that said acoustic transmission window is movable into and out of alignment with said acoustic emitter and said acoustic detector, and such that when said acoustic transmission window is moved into alignment with said acoustic emitter and said acoustic detector, said acoustic energy from said acoustic emitter is received by said acoustic detector.

8. The sensor system of claim 7, wherein said acoustic emitter is an acoustic pulse emitter, said acoustic detector is an acoustic pulse detector, and said lock plate is aligned with said acoustic pulse emitter on one side of said acoustic transmission window and said acoustic pulse detector on the other side of the acoustic transmission window when the locking assembly is in an engaged position.

* * * * *